(12) United States Patent
Jain et al.

(10) Patent No.: US 8,160,616 B2
(45) Date of Patent: Apr. 17, 2012

(54) DEAD SPOT PREDICTION METHOD FOR WIRELESS VEHICULAR APPLICATIONS

(75) Inventors: Vivek Jain, Mountain View, CA (US); Badri Raghunathan, San Jose, CA (US); Vinod Kone, Goleta, CA (US)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 12/406,219

(22) Filed: Mar. 18, 2009

(65) Prior Publication Data

US 2010/0240346 A1 Sep. 23, 2010

(51) Int. Cl.
*H04M 3/42* (2006.01)
(52) U.S. Cl. ........... 455/456.3; 455/456.1; 455/414.1; 455/414.2
(58) Field of Classification Search ....... 455/456.1–457, 455/440, 404.1–404.2, 569.2, 414.1–414.4
See application file for complete search history.

(56) References Cited

U.S. PATENT DOCUMENTS

| | | | |
|---|---|---|---|
| 6,597,906 B1 * | 7/2003 | Van Leeuwen et al. | ... 455/422.1 |
| 7,076,245 B1 | 7/2006 | Satapathy | |
| 7,127,213 B2 * | 10/2006 | Haymes et al. | ............ 455/67.11 |
| 2001/0016488 A1 | 8/2001 | Haymes et al. | |
| 2006/0040609 A1 | 2/2006 | Petschke | |
| 2006/0193380 A1 * | 8/2006 | Laksono | ................ 375/240.01 |
| 2006/0205402 A1 | 9/2006 | Banavar et al. | |
| 2007/0190928 A1 | 8/2007 | Nichols et al. | |
| 2008/0140719 A1 | 6/2008 | Chaney et al. | |
| 2008/0201370 A1 | 8/2008 | Kemp | |
| 2010/0035614 A1 * | 2/2010 | Yokota et al. | ................ 455/436 |

FOREIGN PATENT DOCUMENTS

GB 2 387 074 A 10/2003

* cited by examiner

*Primary Examiner* — Ajit Patel
*Assistant Examiner* — Erica Navar
(74) *Attorney, Agent, or Firm* — Taft Stettinius & Hollister, LLP

(57) ABSTRACT

A wireless communication method includes identifying a location of a dead spot region within an expected route of a vehicle. It is estimated whether the vehicle will arrive at the dead spot region before a wireless application is completed. It is determined whether an expected time period that the vehicle will be disposed within the dead spot region is greater than a maximum allowable disconnection time. A dead spot mitigation technique is initiated dependent upon the estimating and determining steps.

20 Claims, 10 Drawing Sheets

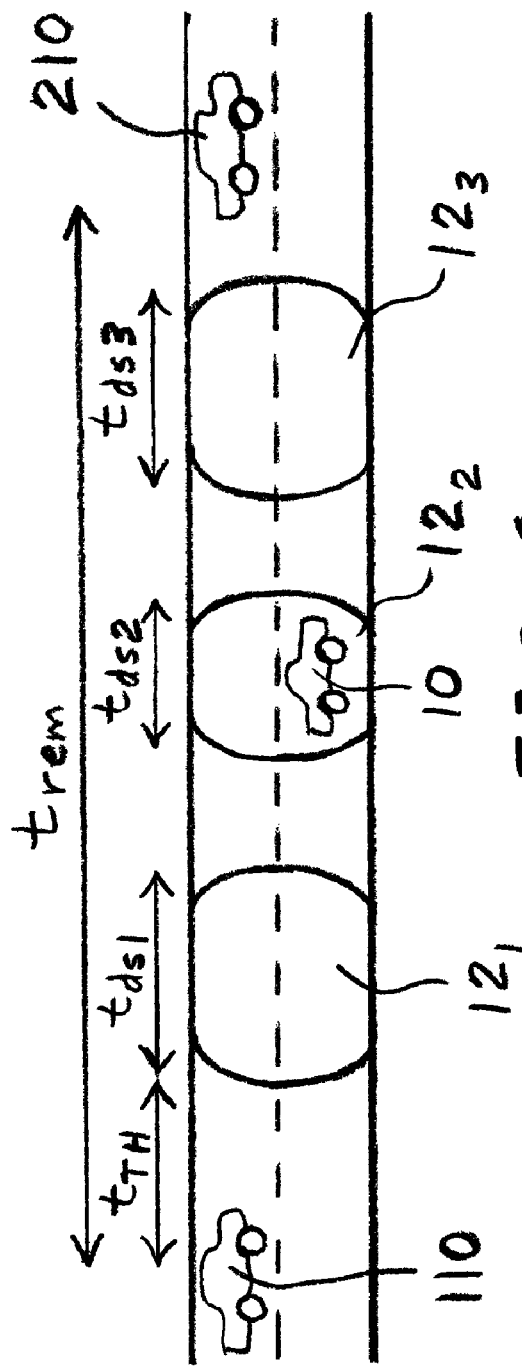
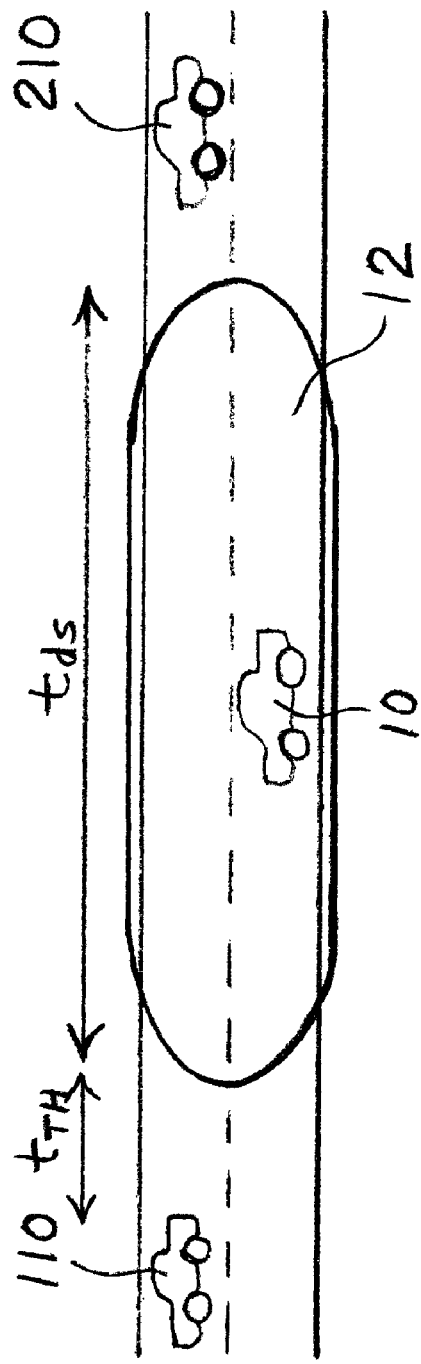
FIG. 6a
FIG. 6b

DEAD SPOT PREDICTION METHOD FOR WIRELESS VEHICULAR APPLICATIONS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2009, Robert Bosch GmbH, All Rights Reserved.

BACKGROUND

1. Field of the Invention

The present invention relates to a method for wireless communication, and, more particularly, to a method for wireless communication with increased performance and reliability within a vehicle.

2. Description of the Related Art

It is known for wireless communication to be employed between and within various systems within a vehicle, such as an automobile. Attaining reliable wireless communication with a vehicle is problematic, however, because wireless communication is deeply affected by the quality of the wireless signals as received by the vehicle. The quality of the signals received by the vehicle are highly dependent upon the distance between the vehicle and the nearest transmitting base station. The relationship between signal quality and distance is primarily due to the power of the received signal dropping exponentially with increasing distance between the vehicle and the nearest transmitting base station.

Signal quality is low within so-called "dead spots" within a geographic area. Dead spots are the regions where the running application does not meet the desired quality of service. Often this phenomenon is caused by the loss of connectivity to the base station, or to the transmitting station, due to poor coverage, i.e., low signal strength. As the numbers of users and applications grow, the limited network capacity can also lead to the bandwidth per user being reduced to a level that is insufficient for the desired quality of service.

As the capacity of cellular technologies increase and wireless proliferation in the car continues, future cars will have a lot of triple play applications (i.e., voice, data and video) running in the car. However, there must be enough wireless connectivity and capacity for such applications. As the applications grow in number and their numbers of users increase, the capacity issues will continue to arise even with the next generation of cellular technologies. Moreover, it is not economical to cover every point of road with wireless coverage and hence connectivity will also be an issue at some points along the road. A dead spot region in a section of roadway due to poor coverage is shown in FIG. 1a. A dead spot region in a section of roadway due to low network capacity and/or poor quality of service, in contrast, is shown in FIG. 1b. As mentioned above, these locations with poor connectivity or capacity may be referred to as dead spot regions.

What is neither disclosed nor suggested in the art is a method for mobile wireless communication that overcomes the above-mentioned problems and disadvantages. More specifically, although using cellular/wireless technologies to provide internet applications in vehicle applications is very well known, the prior art does not disclose or suggest dead spot representation, maintenance or prediction.

SUMMARY OF THE INVENTION

The present invention provides a method for identifying, maintaining and predicting dead spots for mobile wireless applications in a vehicle. The present invention outlines application attributes and describes circular, rectangular and irregular boundary coordinate arrangements to represent dead spots wherein signal quality is poor. Proactive and reactive dead spot identification techniques are also provided by the present invention. Finally, a dead spot prediction algorithm is presented along with a technique for merging dead spots for better quality of service. The dead spot prediction algorithm can be used to trigger mitigation techniques so as to ensure a high quality user experience under poor wireless connectivity conditions.

The invention introduces effective strategies to identify, maintain and mitigate dead spots in wireless coverage and connectivity for vehicular internet applications, and especially those including multimedia. No particular knowledge of the invention may be required of wireless service providers, and the invention may not require the vehicle to have any particular knowledge of the service providers. The invention applies to any wireless technology, including cellular, WiMAX, Wi-Fi, etc., that the car uses to communicate with the application server/provider.

The invention comprises, in one form thereof, a wireless communication method including identifying a location of a dead spot region within an expected route of a vehicle. It is estimated whether the vehicle will arrive at the dead spot region before a wireless application is completed. It is determined whether an expected time period that the vehicle will be disposed within the dead spot region is greater than a maximum allowable disconnection time. A dead spot mitigation technique is initiated dependent upon the estimating and determining steps.

The invention comprises, in another form thereof, a wireless communication method including identifying respective locations of a plurality of dead spot regions that a vehicle will enter before a wireless application is completed. It is determined whether a total expected time period that the vehicle will be disposed within the dead spot regions is greater than a first maximum allowable disconnection time. The dead spot regions are merged into a merged dead spot region. The merging is performed dependent upon the determining step. It is ascertained whether an expected time period that the vehicle will be disposed within the merged dead spot region is greater than a second maximum allowable disconnection time. A dead spot mitigation technique is initiated dependent upon the ascertaining step.

The invention comprises, in yet another form thereof, a wireless communication method including providing a plurality of vehicles, and sensing a plurality of dead spot regions encountered by the vehicles while traveling. The sensing is performed within the vehicles. Locations of the sensed dead spot regions are recorded within the vehicles. The dead spot region locations sensed by the vehicles are transmitted from the vehicles to a central controller. The dead spot region locations transmitted by the vehicles are sent back to the vehicles such that each vehicle has access to ones of the dead spot region locations sensed by other ones of the vehicles. The dead spot regions are mitigated, within the vehicles, by use of the sent dead spot region locations.

An advantage of the present invention is that the performance of mobile wireless communications while traveling through dead spots may be improved.

Another advantage is that the present invention may be implemented regardless of the underlying wireless service provider.

Yet another advantage is that the invention may be employed in any automotive internet application, and especially in those applications including multimedia.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 6a is a diagram illustrating a roadway having three individual dead spot regions in close proximity to each other.

FIG. 6b is a diagram illustrating the roadway of FIG. 6a with the three individual dead spot regions having been merged together according to one embodiment of a merging algorithm of the present invention.

Figure 1A:
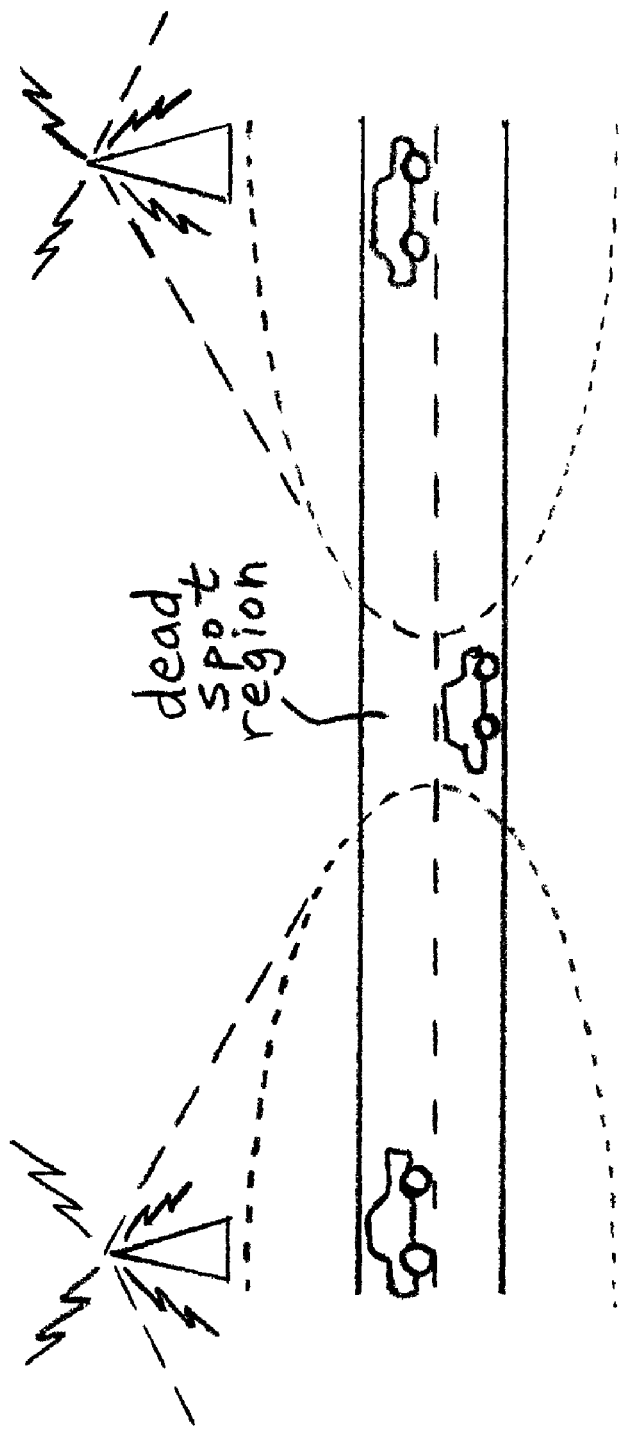
FIG. 1a is a diagram of a wireless communication dead spot region along a section of roadway due to poor coverage according to the prior art.
Figure 1B:
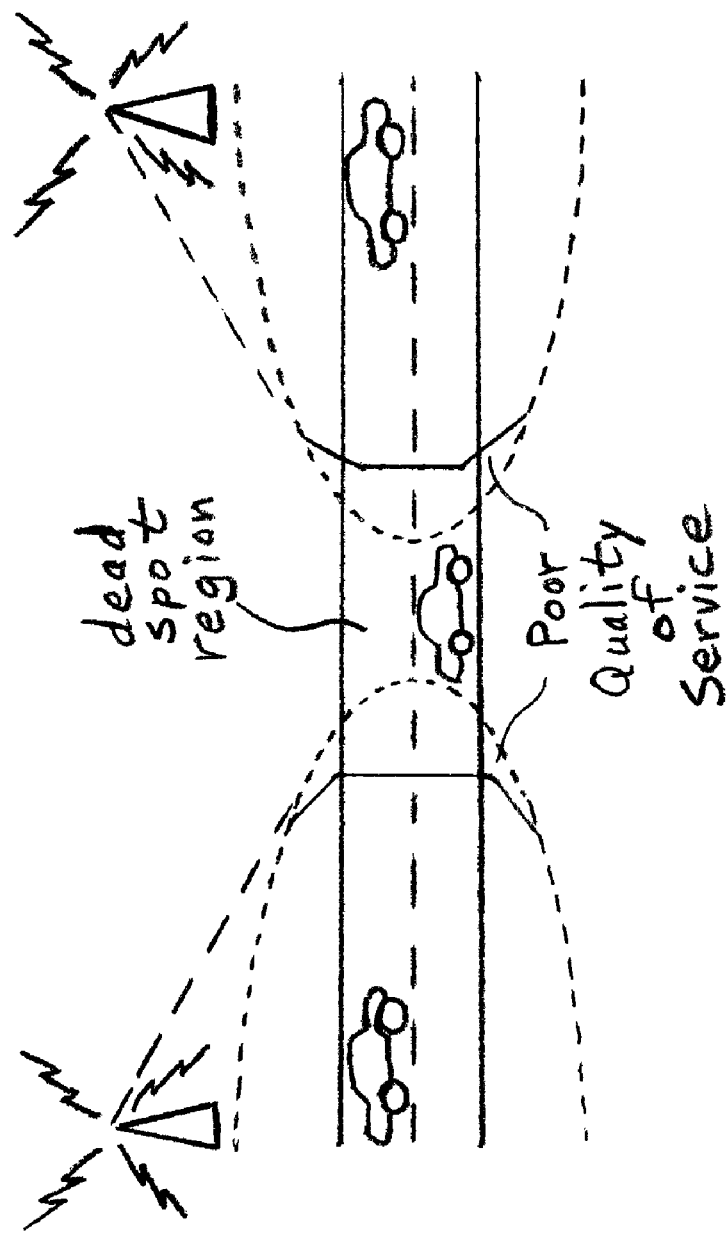
FIG. 1b is a diagram of a wireless communication dead spot region along a section of roadway due to low network capacity and/or poor quality of service according to the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

An application will not perform well if the vehicle is in the dead spot region, and the poor performance inevitably leads to an unpleasant user experience. In order to enhance application performance, techniques to predict dead spots and mitigate their effects may be implemented as a three step process. A first step is dead spot identification and maintenance; a second step is dead spot prediction; and a third step is dead spot mitigation strategies.

The present invention deals with the first two steps above, which are very general in nature and apply to all applications. In contrast, the dead spot mitigation strategies are application domain specific. Particular dead spot mitigation strategies are known to those of ordinary skill in the art of particular application domains. Future wireless applications in vehicles are likely to provide flexibility in choice of service providers.

Dead spot prediction may include identifying the application attributes for dead spots and informing the running application in advance so that appropriate mitigation strategies can be triggered. As stated above, the dead spot for an application may be defined as the point where the network performance (bandwidth, data rate, and latency) is below the desired level. A dead spot for one application may not be a dead spot for another application. Thus, each service is associated with several application attributes. A first of these application attributes is application requirements such as the streaming data rate, the initial buffer, the maximum jitter allowed, the maximum disconnection time ($t_{dis}$) (which is a function of the streaming rate and the initial buffer), the lower streaming rates possibility and related coding formats, the supported players, etc. A second of the application attributes is application service provider related data such as the maximum number of threads allowed, the list of application servers (alternate content distribution networks), etc. A third of the application attributes is the type of dead spot, whether known or predicted.

The present invention deals with the last attribute above. These dead spots may be dependent on the application requirements, the application service provider, and four parameters as described below. The first of the four parameters is the wireless technology/network including the lower level protocols. The second parameter is the network capacity dependent on the network policies and the number of users contending for the service. The third parameter is the network coverage. The fourth parameter is dead spot identification and data maintenance.

Figure 2:
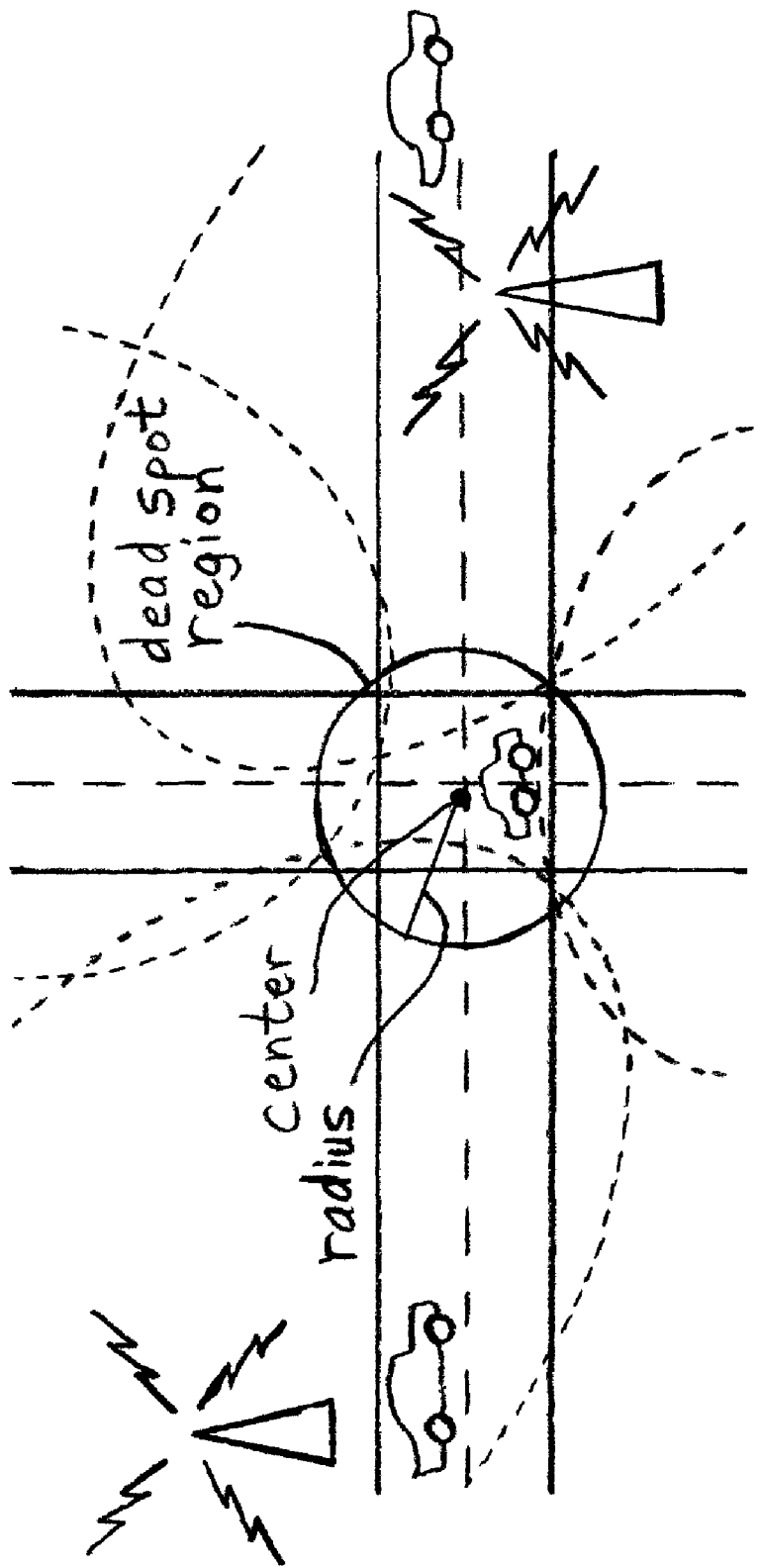
FIG. 2 is a diagram of a wireless communication dead spot region having an irregular shape along a section of roadway, which is modeled as a circular dead spot region.

Addressing the fourth parameter of dead spot identification and data maintenance, including dead spot representation, a dead spot on the road can have a random shape as illustrated in FIG. 2. However, for tractability in terms of data storage and dead spot calculation/prediction, the circular and rectangular representation of the dead spot may be helpful. A circular dead spot model may be good for congested intersections or dense road networks. On the other hand, a rectangular dead spot model may be better for freeways.

The circular dead spot may be defined as a three attribute tuple, including the coordinates of the center of the circle, the radius of the circle, and the average network bandwidth, as illustrated in FIG. 2. The center of the circle may be defined by the latitude and longitude of its location.

For the vehicle, the actual shape of the dead spot may not be important because the dead spot may have been approximated by or modeled as a circular shape. The vehicle may just calculate whether its distance from the center of the circle is less than the radius or not.

Figure 3:
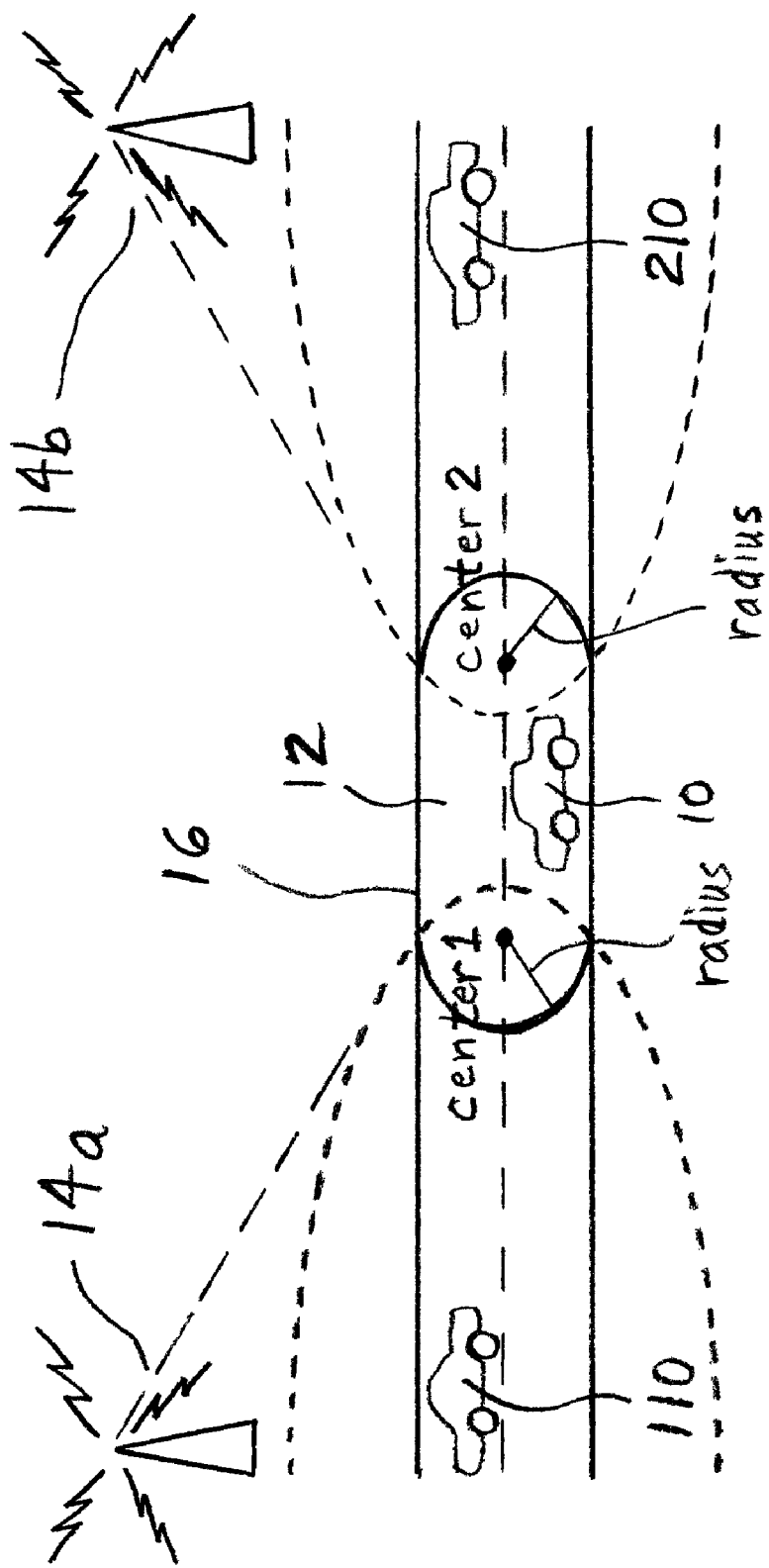
FIG. 3 is a diagram of a wireless communication dead spot region which is modeled as a generally rectangular dead spot region.

As shown in FIG. 3, the dead spot region may also be modeled with generally rectangular boundary coordinates. In this case, the two points on the road at the beginning and end, respectively, of the dead spots are identified. Thus, a dead spot may be identified by a four attribute tuple including the coordinates of the center of the circle at the beginning (center1), the coordinates of the center of the circle at the end (center2), the radius of the circles, and the average network bandwidth, as illustrated in FIG. 3. A vehicle 10 may be considered to be in a dead spot region 12 with respect to transmitting stations 14a-b if a location of vehicle 10 is within a boundary 16.

Turning now to dead spot identification, as mentioned above, dead spots are the regions with no coverage or with limited network capacity. In either case, it may not be possible to use the network for audio/video streaming capabilities. Dead spot identification may include representing these dead spots in one of the two forms mentioned above, i.e., as circular, or as two circles plus the space between the circles. The dead spots can be identified in both proactive and reactive ways.

The proactive method of dead spot identification may be used for identifying coverage related dead spots using the path loss models. The received power may be proportional to $r^{-k}$ (k=2 in free space and k=4 in a highly scattered environment), where r is the distance between the receiver and the transmitter. Normally k varies between 2 and 4. So, the dead spot regions may be the areas where the received power is less than the receiver sensitivity or the desired threshold. This information regarding the locations of the dead spot regions may be provided to the car by the wireless service provider. Dead spots identified by proactive measures may fall under the category of known dead spots.

Reactive strategies may be used for capacity-related dead spots wherein every vehicle senses and stores the coordinates of a dead spot region whenever the vehicle experience bad quality of service. Dead spots identified by reactive strategies may fall under the category of predictive dead spots.

With regard to dead spot data maintenance, proactive data can be maintained and provided by the service providers. Conversely, reactive data can be maintained by the vehicle itself, within a Personal Level of stored data.

For better performance, the reactive data calculated by the vehicle can be transmitted to the service provider so that the service provider always has the real-time data. The service provider can then share the real-time data with other vehicles traveling within the area associated with the real-time data. Each vehicle may store the received data within a Community Level of stored data.

The data exchange between the vehicle and the service provider may be a time consuming process. Thus, it may depend upon the individual vehicle whether the vehicle needs real-time data or the data stored and/or maintained by the vehicle is sufficient.

The present invention may include dead spot prediction, as dead spot identification by itself may be of no great use. The overall idea may be to inhibit the user/driver of the vehicle from experiencing the jitter effects caused by the dead spot in the first place. Hence, it may be beneficial to predict the location of, and/or time of arrival at, a dead spot. This dead spot prediction may be beneficially made before a certain point in time so that the mitigation strategies can be triggered at the right time.

Dead spot prediction strategies may depend on the following attributes:
1. Dead spot representation system
2. Current vehicle speed (s)
3. Average speeds for the road segment (d) under consideration ($s_{ave}$)
4. The diameter/length of the dead spot region ($d_{ds}$)
5. Current GPS coordinates and the vehicle route
6. Application specific requirements such as data rate, allowed jitter, etc.

Figure 4A:
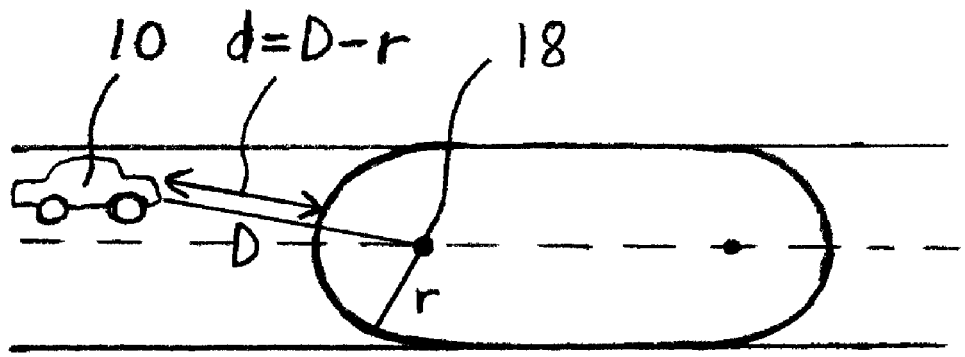
FIG. 4a is a diagram illustrating the calculation of a variable used in estimating a time period before a vehicle arrives at a generally rectangular dead spot region.
Figure 4B:
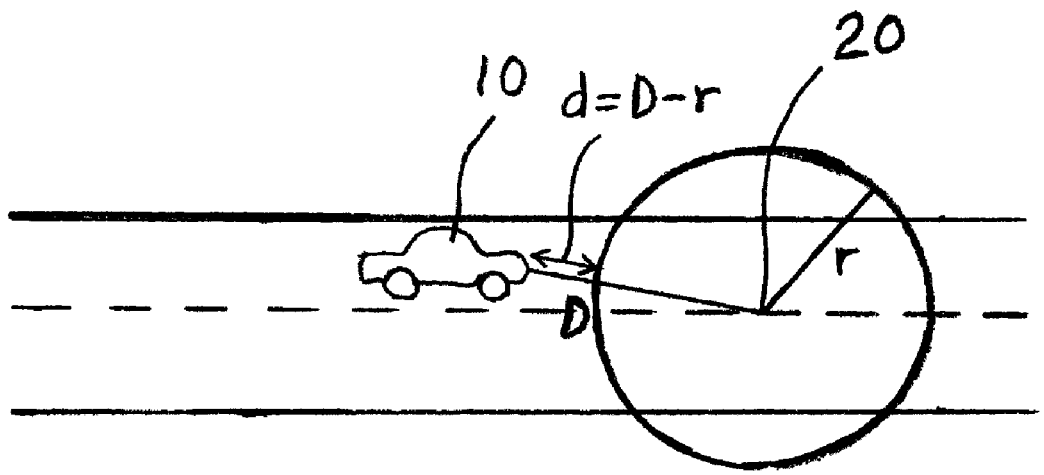
FIG. 4b is a diagram illustrating the calculation of a variable used in estimating a time period before a vehicle arrives at a circular dead spot region.

Based on the first five attributes above, two parameters discussed below may be calculated. A first of the two parameters is the average time left to hit the dead spot region ($t_{TH}$). That is, the first parameter may be the average time remaining before the dead spot region is arrived at. One possible way to calculate this first parameter is by using the following equation (1):

$$t_{TH} = d/[\alpha s + (1-\alpha)s_{ave}] \quad (1)$$

where, $\alpha$ is an averaging constant which can be fixed to a value of 0.5 or empirically determined using real-time averages, for example. The variable $s_{ave}$ is the average speed. The variable d may be calculated as illustrated in FIGS. 4a and 4b. Specifically, in the case of the quasi-rectangular dead spot region shown in FIG. 4a, the variable d is calculated as a difference D−r, where D is a distance between vehicle 10 and a center 18 of the beginning circle of the dead spot region, and r is the radius of the beginning circle. Similarly, in the case of the circular dead spot region shown in FIG. 4b, the variable d is calculated as a difference D−r, where D is a distance between vehicle 10 and a center 20 of the circle defining the dead spot region, and r is the radius of the circle.

A second of the two parameters that are calculated based on the first five of the six attributes listed above is the average time spent in the dead spot region ($t_{ds}$), which may be calculated according to the following equation (2):

$$t_{ds} = d_{ds}/s_{ds\,ave} \quad (2)$$

where $s_{ds\,ave}$ is the average speed of the vehicle through the dead spot.

Based on the application requirements, the remaining time required to run the application ($t_{rem}$) may be calculated as shown in equation (3):

$$t_{rem} = (\text{Actual data bytes} - \text{Data bytes already played})/\text{Streaming rate} \quad (3)$$

where "Actual data bytes" is the total number of data bytes required to run the application, "Data bytes already played" is the total number of data bytes played in running the application as of the current time, and "Streaming rate" is rate expressed in bytes per unit time at which the application is run.

Figure 5:
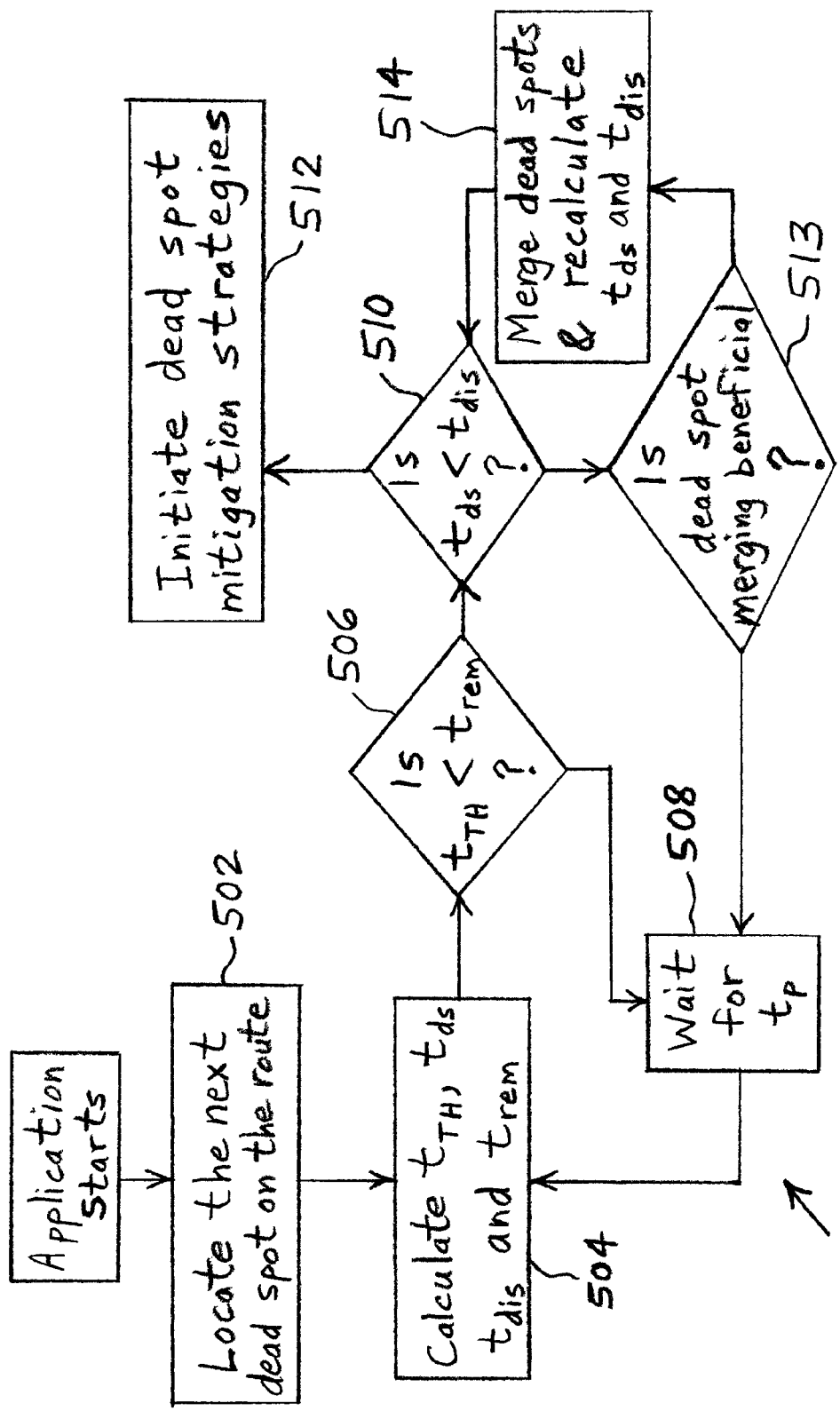
FIG. 5 is a flow chart of one embodiment of a dead spot prediction algorithm of the present invention.

On a very basic level, the dead spots prediction algorithm may then use the above calculated times in triggering the mitigation strategies. A flowchart for one embodiment of a dead spot prediction algorithm 500 of the present invention is illustrated in FIG. 5. In the flow chart, $t_p$ denotes the time period of the dead spot evaluation algorithm and is dependent on the mitigation strategies. The variable $t_{dis}$ is the maximum disconnection time allowed and is calculated as shown in equation (4):

$$t_{dis} = \text{Average bytes in buffer/Streaming rate} \quad (4)$$

Thus, $t_{dis}$ may be the expected time period required to fill the buffer.

In step 502, the next dead spot on the route is located. That is, the vehicle may use its navigation system in conjunction with its own database of dead spots that the vehicle has previously encountered in order to determine or identify the next dead spot that the vehicle will encounter on its planned route. Alternatively, or in addition, the vehicle may receive dead spot location information wirelessly from a service provider. The dead spot location information from the service provider may have been collected wirelessly from other vehicles. It is also possible for the locations of dead spots to be downloaded into the vehicle at the factory where the vehicle is assembled, or at the facility where the memory device that stores the dead spot location information is manufactured.

In a next step 504, the time durations $t_{TH}$, $t_{ds}$, $t_{dis}$, and $t_{rem}$ are calculated. These variables may be calculated as shown in equations (1), (2), (3) and (4), for example.

In step 506 it is determined whether the time before arriving at the dead spot $t_{TH}$ is less than the remaining time required to run the application $t_{rem}$. If not, then operation proceeds to step 508, wherein the time period $t_p$ of the dead spot evaluation algorithm is waited for. Operation then returns to step 504 wherein the time durations $t_{TH}$, $t_{ds}$, $t_{dis}$, and $t_{rem}$ are recalculated. That is, updated values for time durations $t_{TH}$, $t_{ds}$, $t_{dis}$, and $t_{rem}$ may be calculated when it is meaningful to do so.

If, however, it is determined in step 506 that the time before arriving at the dead spot $t_{TH}$ is less than the remaining time required to run the application $t_{rem}$, then operation proceeds to step 510 wherein it is determined whether the average time spent in the dead spot region $t_{ds}$ is less than the maximum allowed disconnection time $t_{dis}$. If not, then the dead spot presents a quality of service problem, and operation proceeds to step 512 wherein dead spot mitigation strategies are initiated.

If, however, it is determined in step 510 that the average time spent in the dead spot region $t_{ds}$ is less than the maximum allowed disconnection time $t_{dis}$, then operation proceeds to step 513 where it is determined whether dead spot merging is required. That is, in the case where $t_{TH}$ is less than $t_{rem}$ and $t_{ds}$ is less than $t_{dis}$, then the application may not trigger mitigation algorithms (step 512), but rather may continue streaming as the dead spot region is very small and there is enough data in the buffer.

However, even if $t_{TH}$ is less than $t_{rem}$ and $t_{ds}$ is less than $t_{dis}$, in the event that another dead spot comes soon after the previously identified dead spot, then there may not be enough data in the buffer and not enough time for mitigation strategies to be effective. Hence, for cases where there are multiple dead spots within short intervals, it may be appropriate to merge these small segments into one big dead spot segment. More particularly, the dead spots may be merged and $t_{ds}$ and $t_{dis}$ may be recalculated (step 514). Dead spot merging may include locating all dead spots within the $t_{rem}$ time. Again on the general level, if the maximum allowed disconnection time $t_{dis}$ is less than the total time spent in those merged dead spots (step 510), then mitigation strategies are triggered (step 513) and the dead spot segments are merged together (step 514). Otherwise, no merging is performed.

One specific example of merging is illustrated with reference to FIGS. 6a and 6b. The roadway in FIG. 6a is shown as including three dead spot regions $12_1$, $12_2$ and $12_3$. Each of the three dead spot regions may have a different length along the roadway, and hence each of the three regions may also correspond to a different expected length of time $t_{ds1}$, $t_{ds2}$, $t_{ds3}$, that a vehicle 10 will spend in the dead spot region. As indicated by the lengths of the double arrows in FIG. 6a, the time $t_{TH}$ before arriving at dead spot region $12_1$ is much less than the remaining time required to run the application $t_{rem}$.

If it is determined that the sum of the average times spent in each of the dead spot regions is greater than the maximum allowed disconnection time (i.e., $t_{dis} < (t_{ds1} + t_{ds2} + t_{ds3})$, then the three dead spot regions may be merged into one larger dead spot region. As shown in FIG. 6b, the resulting merged dead spot region 12 may cover an area that is larger than the sum of the areas covered by the three merged dead spot regions individually. Further, the expected time to be spent in the merged dead spot region may be greater than the sum of the average times spent in the three dead spot regions individually (i.e., $t_{ds1 > (tds1} + t_{ds2} + t_{ds3})$).

The three merged dead spot regions are modeled in FIG. 6a as substantially rectangular areas. However, it is also possible for dead spot regions that are modeled as circular areas to be merged together to form a merged dead spot region that is shaped substantially the same as the merged dead spot region shown in FIG. 6b. Further, it is also possible for dead spot regions that are modeled as different shapes, e.g., circular and rectangular areas, to be merged together to form a merged dead spot region that is shaped substantially the same as the merged dead spot region shown in FIG. 6b.

The present invention includes many different novel features, including dead spot prediction and maintenance for wireless vehicular applications independent of the underlying wireless service provider; dead spot representation techniques; a proactive dead spot identification method, i.e., collaborating with a wireless service provider to generate a list of known dead spot regions; a reactive dead spot identification method wherein a vehicle itself records the locations where the network performance is below the required threshold; a method in which a vehicle exchanges dead spot data with the application service provider so that both are updated and the data can also be used by other vehicles; dead spot prediction in general; a dead spot prediction algorithm; a dead spot merging method; and the applicability of the present invention to any mobile wireless device with internet connectivity which can be used in any scenario, such as home, office, car, walking, etc.

Figure 7:
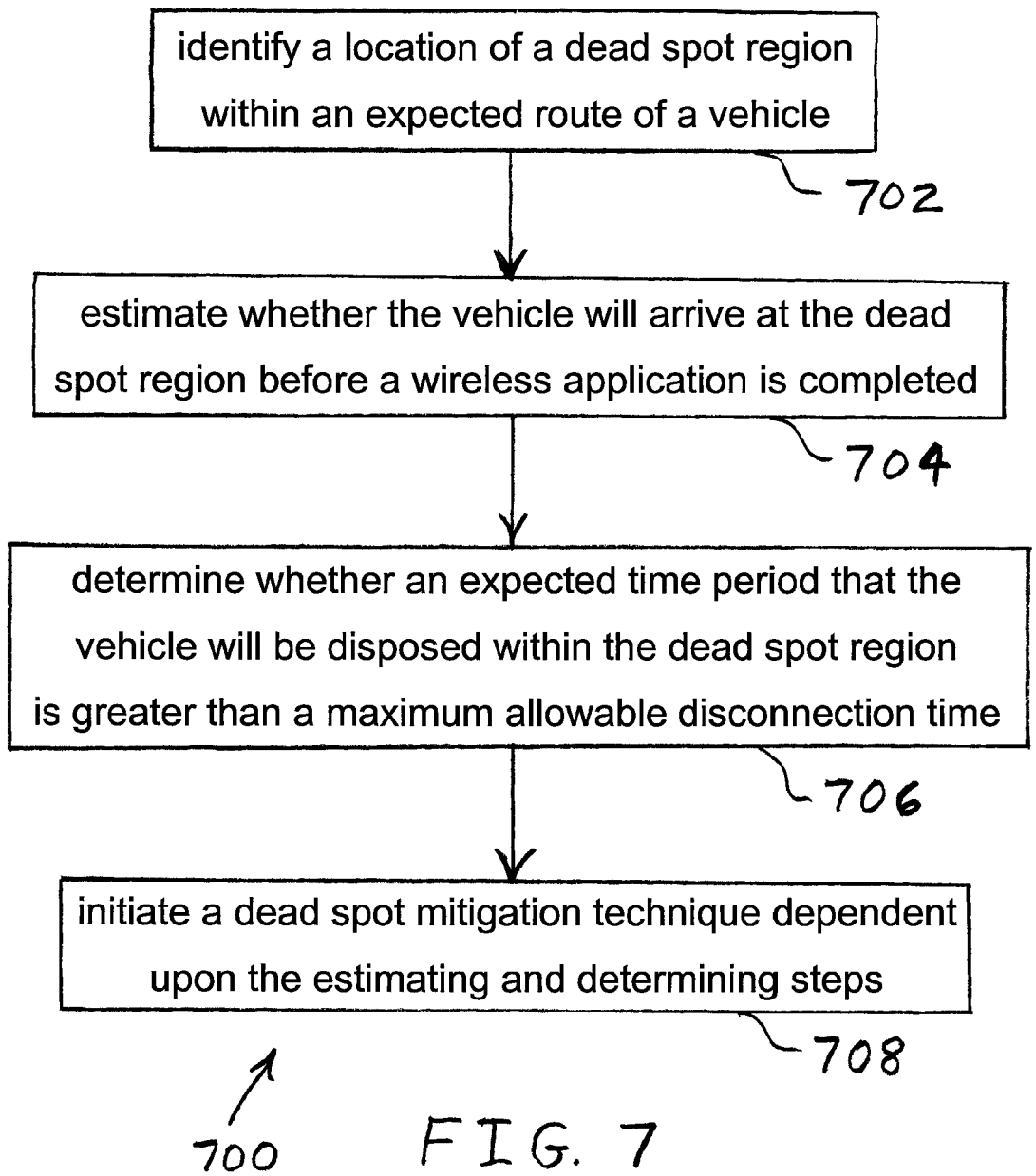
FIG. 7 is a flow chart illustrating one embodiment of a wireless communication method of the present invention.

One embodiment of a wireless communication method 700 of the present invention is illustrated in FIG. 7. In a first step 702, a location of a dead spot region within an expected route of a vehicle is identified. For example, in the embodiment illustrated in FIG. 3, a location of a dead spot 12 defined by boundary 16 within an expected route of a vehicle 110 may be identified. That is, dead spot 12 may have been sensed by a vehicle 210 that has already passed through it. Vehicle 210 may have transmitted the location coordinates of dead spot 12 to the service provider, and the service provider may have shared the location coordinates with all other vehicles in the vicinity of dead spot 12, such as vehicles 10 and 110. Alternatively, vehicle 110 may have passed through and sensed dead spot 12 previously, and may have recorded the location coordinates of dead spot 12 for future use.

In a second step 704, it is estimated whether the vehicle will arrive at the dead spot region before a wireless application is completed. For example, in step 506 (FIG. 5) it is determined whether an average time left $t_{TH}$ to hit the dead spot region is less than a time $t_{rem}$ required to run the application. If so, then the vehicle will likely arrive at the dead spot region before the wireless application is completed.

In a third step 706, it is determined whether an expected time period that the vehicle will be disposed within the dead spot region is greater than a maximum allowable disconnection time. For example, in step 510 (FIG. 5) it is conversely determined whether an average time $t_{ds}$ spent in the dead spot region is less than a maximum disconnection time $t_{dis}$ allowed.

In a final step 708, a dead spot mitigation technique is initiated dependent upon the estimating and determining steps. More particularly, as shown in FIG. 5, dead spot mitigation strategies are initiated in step 512 only if it is both estimated in step 506 that the vehicle will arrive at the dead spot region before a wireless application is completed, and it is determined in step 510 that an expected time period that the vehicle will be disposed within the dead spot region is greater than a maximum allowable disconnection time.

Figure 8:
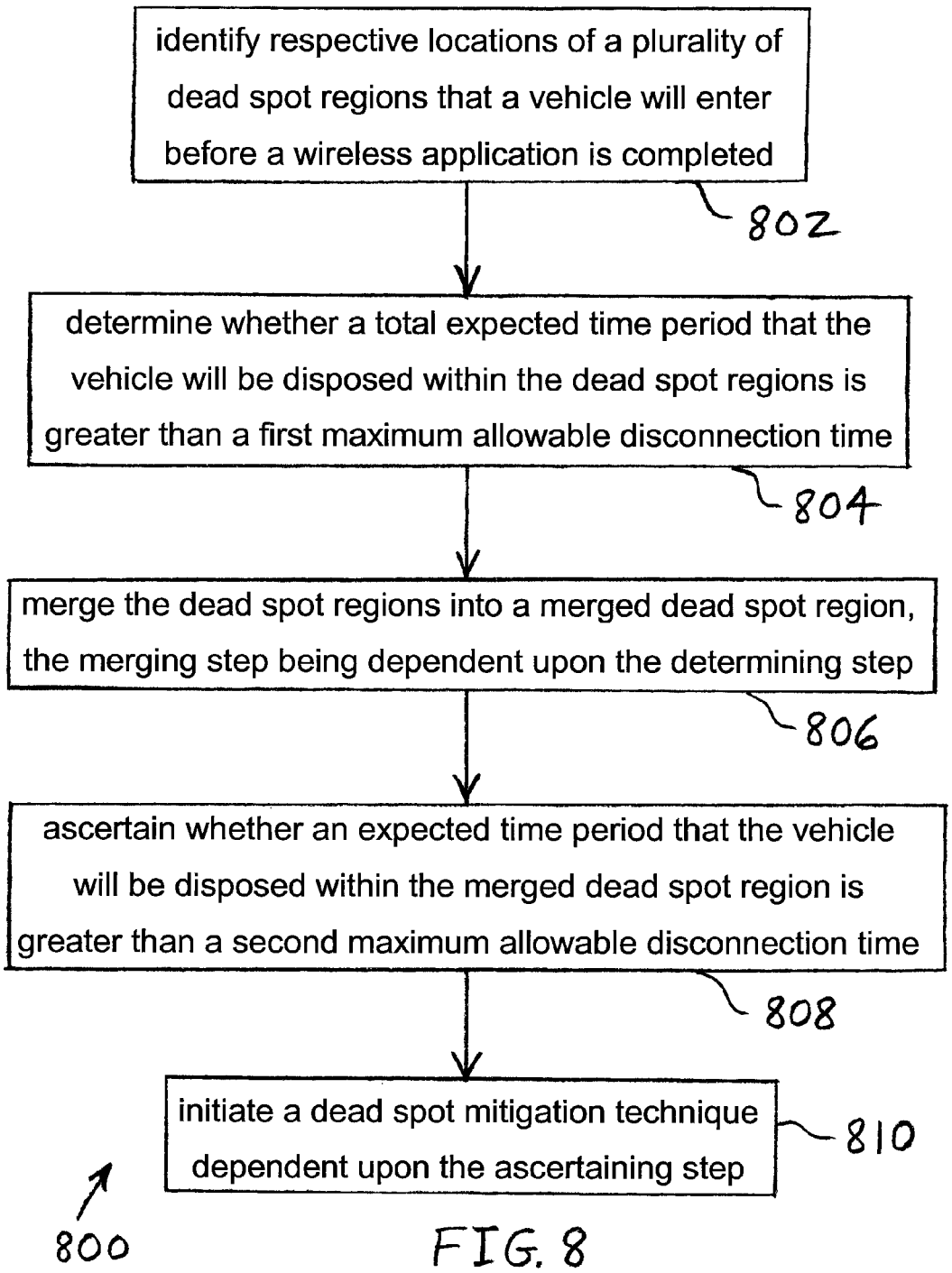
FIG. 8 is a flow chart illustrating another embodiment of a wireless communication method of the present invention.

Another embodiment of a wireless communication method 800 of the present invention is illustrated in FIG. 8. In a first step 802, respective locations of dead spot regions that a vehicle will enter before a wireless application is completed are identified. For example, in the embodiment illustrated in FIG. 6a, respective locations of dead spots $12_1$, $12_2$, $12_3$ that a vehicle 110 will pass through may be identified. That is, dead spots $12_1$, $12_2$, $12_3$ may have been sensed by a vehicle 210 that has already passed through them. Vehicle 210 may have transmitted the location coordinates of dead spots $12_1$, $12_2$, $12_3$ to the service provider, and the service provider may have shared the location coordinates with all other vehicles in the vicinity of dead spots $12_1$, $12_2$, $12_3$, such as vehicles 10 and 110. Alternatively, vehicle 110 may have passed through and sensed dead spots $12_1$, $12_2$, $12_3$ previously, and may have recorded the location coordinates of dead spots $12_1$, $12_2$, $12_3$ for future use. Further, as shown in step 506 (FIG. 5) it may be determined that the vehicle will enter each of dead spot regions $12_1$, $12_2$, $12_3$ before a wireless application is completed.

In a second step 804, it is determined whether a total expected time period that the vehicle will be disposed within the dead spot regions is greater than a first maximum allowable disconnection time. For example, with reference to FIG. 6a, it is determined whether a total expected time period $(t_{ds1}+t_{ds2}+t_{ds3})$ that vehicle 110 will be disposed within dead spot regions $12_1$, $12_2$, $12_3$ is greater than a first maximum allowable disconnection time $t_{dis}$ calculated in step 504.

In a third step 806, the dead spot regions are merged into a merged dead spot region, the merging step being dependent upon the determining step. For example, with reference to FIG. 6a, dead spot regions $12_1$, $12_2$, $12_3$ may be merged into merged dead spot region 12 (FIG. 6b). The merging may be performed only if it is determined in step 512 (FIG. 5) that merging is beneficial. More particularly, merging may be performed only if it is determined in step 804 that a total expected time period $(t_{ds1}+t_{ds2}+t_{ds3})$ that vehicle 10 will be disposed within dead spot regions $12_1$, $12_2$, $12_3$ is greater than a first maximum allowable disconnection time $t_{dis}$ calculated in step 504.

In a fourth step 808, it is ascertained whether an expected time period that the vehicle will be disposed within the merged dead spot region is greater than a second maximum allowable disconnection time. For example, an expected time period $t_{ds}$ that the vehicle will be disposed within the merged dead spot region 12 (FIG. 6b) and a second maximum allowable disconnection time $t_{dis}$ are calculated in step 514 (FIG. 5). It is then ascertained in step 510 whether the recalculated $t_{ds}$ is greater than the recalculated $t_{dis}$.

In a final step 810, a dead spot mitigation technique is initiated dependent upon the ascertaining step. More particularly, as shown in FIG. 5, dead spot mitigation strategies are initiated in step 512 only if it is ascertained in step 510 that an expected time period that the vehicle will be disposed within the merged dead spot region is greater than a maximum allowable disconnection time that has been recalculated after the merging of the dead spot regions.

Figure 9:
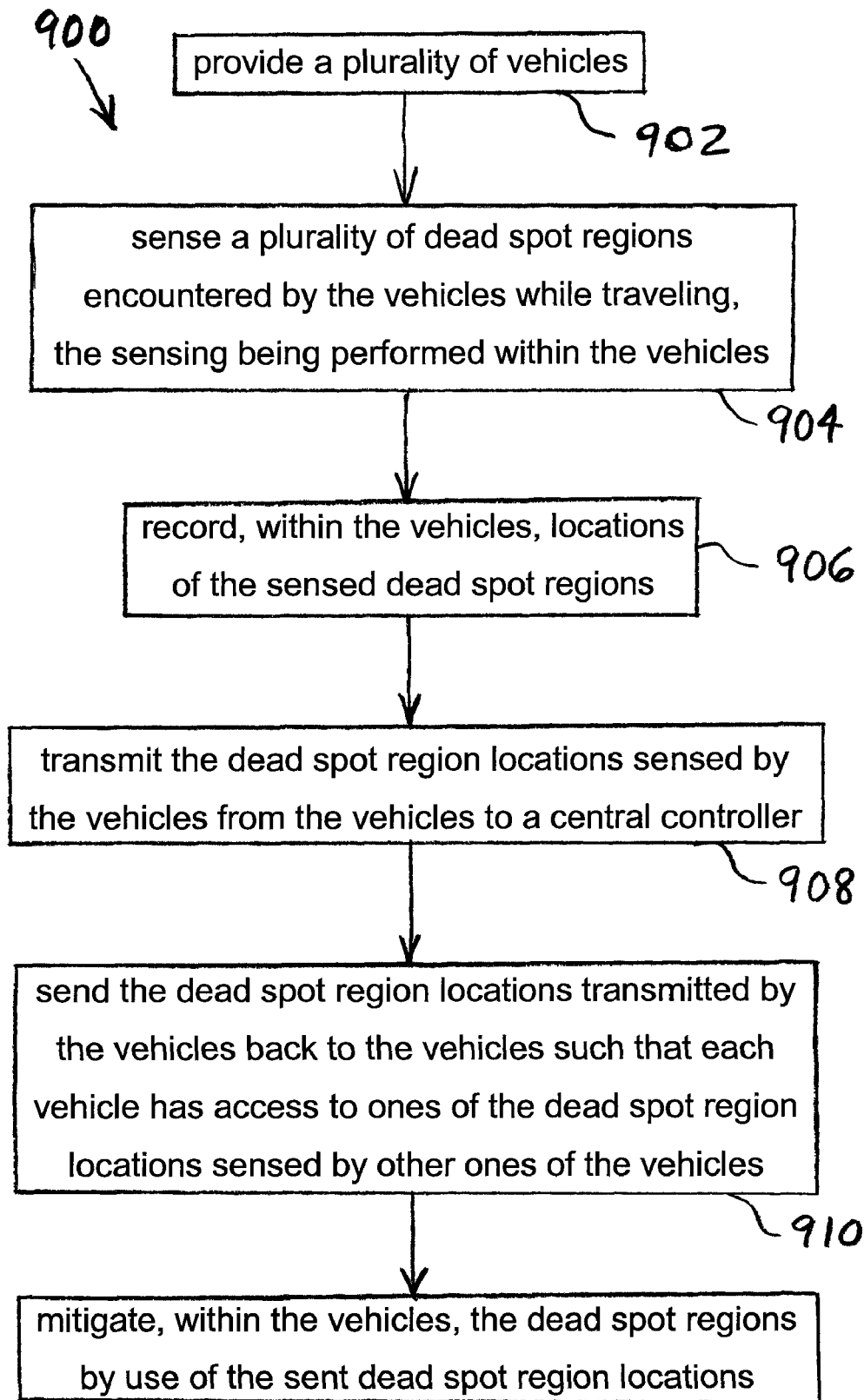
FIG. 9 is a flow chart illustrating yet another embodiment of a wireless communication method of the present invention.

Yet another embodiment of a wireless communication method 900 of the present invention is illustrated in FIG. 9. In a first step 902, a plurality of vehicles are provided. For example, as shown in FIG. 6a, vehicles 10, 110, 210 are provided. Although only a limited number of vehicles may be shown in the drawings herein, it is to be understood that method 900 may involve thousands or millions of vehicles.

In a second step 904, a plurality of dead spot regions encountered by the vehicles while traveling are sensed, the sensing being performed within the vehicles. For example, in the embodiment illustrated in FIG. 6a, respective locations of dead spots $12_1$, $12_2$, $12_3$ that vehicles 10, 110, 210 pass through may be sensed via the in-vehicle applications that are being run. The details of how the dead spots are sensed may depend upon the specific application. This may include variable signal strength detection, data traffic congestion and no coverage among various possible methods. In general, however, the application may sense dead spots as a loss of connectivity or as an interruption in the flow of received data.

In a third step 906, locations of the sensed dead spot regions are recorded within the vehicles. That is, as each of vehicles 10, 110, 210 senses a dead spot region, the vehicle may determine the global geographic coordinates of the dead spot region by use of an in-vehicle global positioning system (GPS), for example. The vehicle may then store the determined global geographic coordinates of the dead spot region in a memory device (not shown).

In a fourth step 908, the dead spot region locations sensed by the vehicles are transmitted from the vehicles to a central controller. That is, the global geographic coordinates of the sensed dead spot region locations may be wirelessly transmitted from vehicles 10, 110, 210 to a central controller in the form of a service provider.

In a fifth step 910, the dead spot region locations transmitted by the vehicles are sent back to the vehicles such that each vehicle has access to ones of the dead spot region locations sensed by other ones of the vehicles. For example, the service provider may retransmit the dead spot region location data that the service provider has received from the vehicles back to each one of the vehicles such that every vehicle has access to all of the other data provided by all the other vehicles. In one embodiment, the service provider may retransmit dead spot region location data that the service provider has received from the vehicles to only those vehicles in the geographic area to which the data pertains. The service provider may continually update the dead spot region location data that is received and stored a particular vehicle based upon the changing locations of the vehicle as the vehicle travels.

In another embodiment, the service provider does not merely send raw dead spot region location data to each of the vehicles. Rather, the service provider compiles the data received from the vehicles, verifying data that has been received multiple times and/or from multiple vehicles, and throwing out data that has been received from only a single vehicle or a relatively low number of vehicles. Other forms of the data compilation performed by the service provider may include statistically analyzing the data from the vehicles, categorizing/classifying the dead spots, and/or characterizing the dead spots based upon how large, severe, or troublesome the dead spots are. Even if each vehicle receives compiled data rather than raw data from the service provider, the vehicle nonetheless thereby has access to, and has the advantage of, the dead spot region location data sensed by the other vehicles.

In a final step 912, the dead spot regions are mitigated within the vehicles by use of the sent dead spot region locations. More particularly, by virtue of a vehicle having knowledge that a dead spot region is in the path of the vehicle, the vehicle is able to initiate mitigating strategies before the dead spot region is actually encountered by the vehicle. Such mitigating strategies may be more effective when they can be initiated before the effects of the dead spot regions are perceivable by the vehicle. The particular form of the mitigation strategies depend upon the particular application being run, and are known to those of skill in the art.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A wireless communication method comprising the steps of:
   identifying a location of a dead spot region within an expected route of a vehicle;
   estimating whether the vehicle will arrive at the dead spot region before a wireless application is completed;
   determining whether an expected time period that the vehicle will be disposed within the dead spot region is greater than a maximum allowable disconnection time; and
   initiating a dead spot mitigation technique dependent upon the estimating and determining steps, wherein the dead spot mitigation technique is initiated only if it is estimated that the vehicle will arrive at the dead spot region location before the wireless application is completed, and wherein the dead spot mitigation technique is initiated only if it is determined that an expected time period that the vehicle will be disposed within the dead spot region is greater than the maximum allowable disconnection time.

2. A wireless communication method comprising the steps of:
   planning a route of a vehicle by use of a navigation system;
   receiving from a database a plurality of locations of dead spot regions;
   identifying one of the dead spot region locations that is within the planned route of the vehicle;
   estimating whether the vehicle will arrive at the dead spot region before a wireless application is completed;
   determining whether an expected time period that the vehicle will be disposed within the dead spot region is greater than a maximum allowable disconnection time; and
   initiating a dead spot mitigation technique dependent upon the estimating and determining steps, wherein the dead spot mitigation technique is initiated only if it is estimated that the vehicle will arrive at the dead spot region location before the wireless application is completed, and wherein the dead spot mitigation technique is initiated only if it is determined that an expected time period that the vehicle will be disposed within the dead spot region is greater than the maximum allowable disconnection time.

3. A wireless communication method comprising the steps of:
   identifying a location of a dead spot region within an expected route of a vehicle, the identifying including:
     sensing a plurality of dead spot regions encountered by the vehicle while traveling, the sensing being performed within the vehicle;
     recording locations of the sensed dead spot regions in a database within the vehicle; and
     comparing the recorded dead spot region locations to a route of the vehicle in a navigation system;
   estimating whether the vehicle will arrive at the dead spot region before a wireless application is completed;
   determining whether an expected time period that the vehicle will be disposed within the dead spot region is greater than a maximum allowable disconnection time; and
   initiating a dead spot mitigation technique dependent upon the estimating and determining steps, wherein the dead spot mitigation technique is initiated only if:
     it is estimated that the vehicle will arrive at the dead spot region location before the wireless application is completed; and
     it is determined that an expected time period that the vehicle will be disposed within the dead spot region is greater than the maximum allowable disconnection time.

4. The method of claim 3, wherein the location of the dead spot region is modeled as one of a circular area and a rectangular area.

5. The method of claim 4, wherein the location of the dead spot region is modeled as a circular area.

6. The method of claim 4, wherein the location of the dead spot region is modeled as a rectangular area.

7. The method of claim 1 wherein the initiating step is commenced before the vehicle arrives at the dead spot region.

8. The method of claim 1 wherein the expected time period that the vehicle will be disposed within the dead spot region is dependent upon an expected speed of the vehicle through the dead spot region.

9. The method of claim 1 wherein the maximum allowable disconnection time is dependent upon a number of bytes in a buffer.

10. The method of claim 1 wherein the maximum allowable disconnection time is dependent upon a streaming rate.

11. The method of claim 1 wherein the location of the dead spot region is modeled as a circular area.

12. The method of claim 1 wherein the location of the dead spot region is modeled as a rectangular area.

13. The method of claim 2 wherein the initiating step is commenced before the vehicle arrives at the dead spot region.

14. The method of claim 2 wherein the expected time period that the vehicle will be disposed within the dead spot region is dependent upon an expected speed of the vehicle through the dead spot region.

15. The method of claim 2 wherein the maximum allowable disconnection time is dependent upon at least one of:
   a number of bytes in a buffer; and
   a streaming rate.

16. The method of claim 2 wherein the location of the dead spot region is modeled as at least one of a circular area and a rectangular area.

17. The method of claim 3 wherein the initiating step is commenced before the vehicle arrives at the dead spot region.

18. The method of claim 3 wherein the expected time period that the vehicle will be disposed within the dead spot region is dependent upon an expected speed of the vehicle through the dead spot region.

19. The method of claim 3 wherein the maximum allowable disconnection time is dependent upon a number of bytes in a buffer.

20. The method of claim 3 wherein the maximum allowable disconnection time is dependent upon a streaming rate.

* * * * *